UNITED STATES PATENT OFFICE.

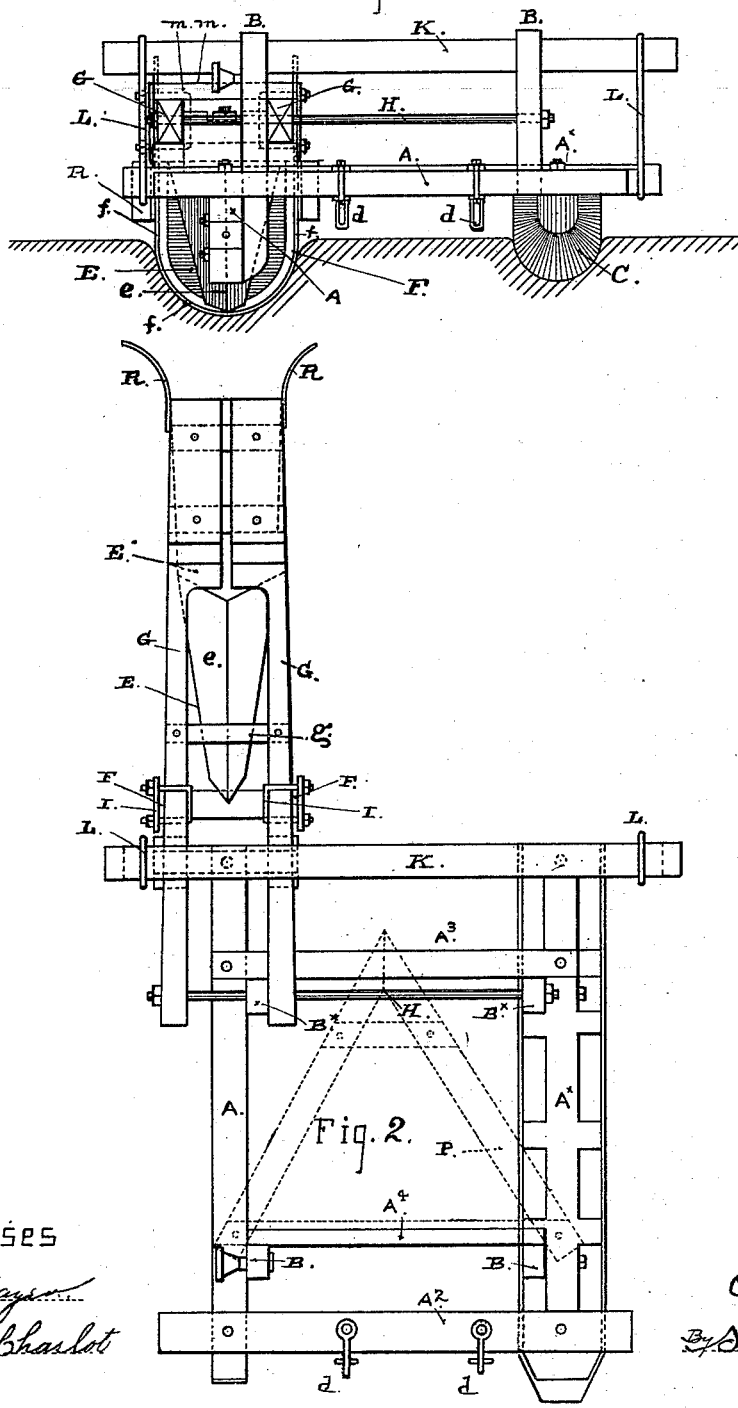

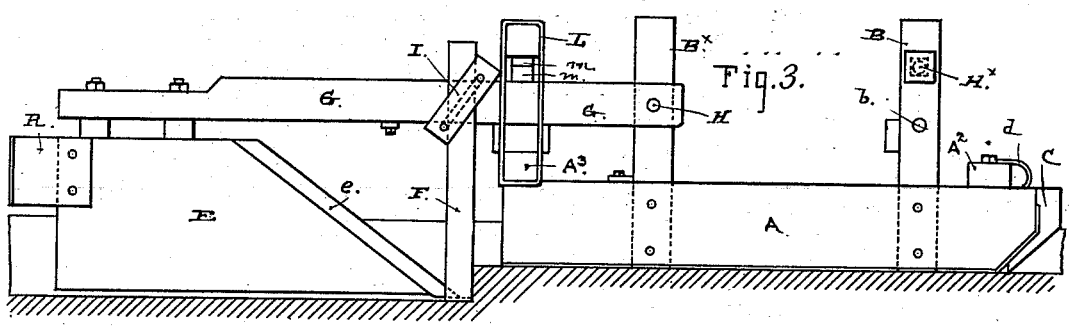
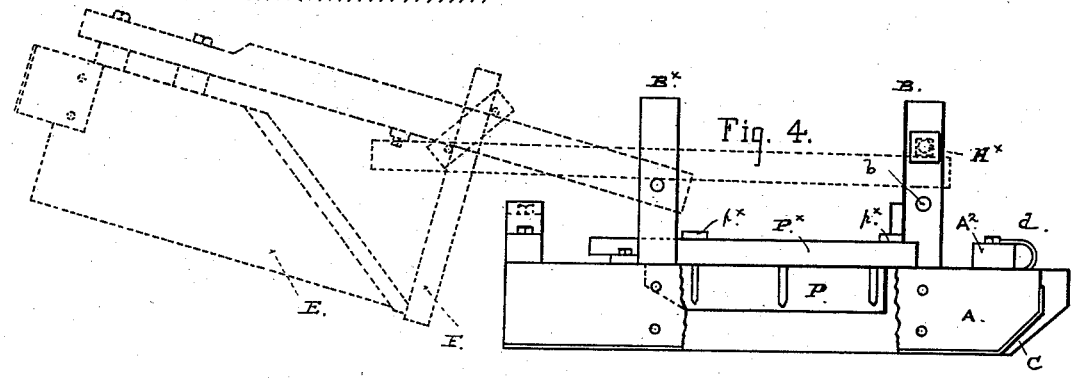
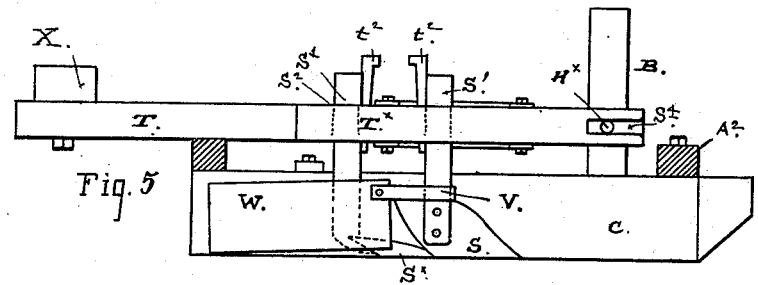
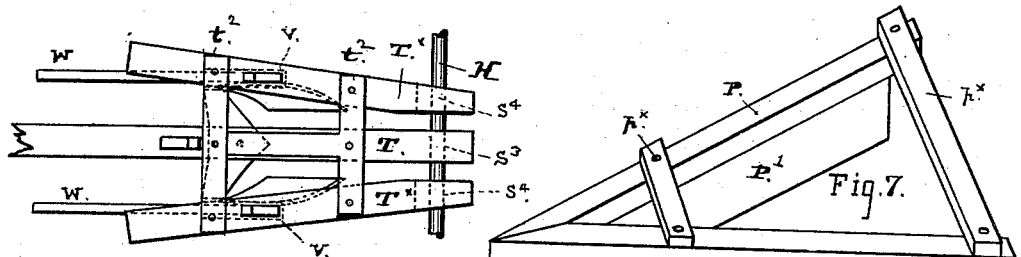
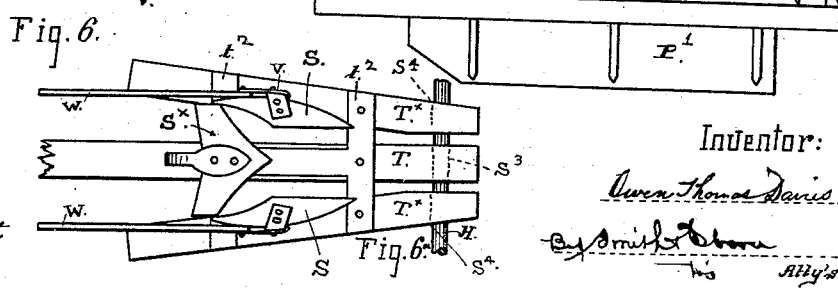

OWEN THOMAS DAVIES, OF BRIGHTON, CALIFORNIA.

COMBINED DITCHER AND CULTIVATOR.

SPECIFICATION forming part of Letters Patent No. 439,933, dated November 4, 1890.

Application filed May 16, 1890. Serial No. 352,049. (No model.)

*To all whom it may concern:*

Be it known that I, OWEN THOMAS DAVIES, a citizen of the United States, residing at Brighton, county of Sacramento, State of California, have invented certain new and useful Improvements in Combined Ditchers and Cultivators, of which the following is a specification.

My invention relates to machines or implements for laying off ditches and preparing lands for the cultivation of berries and fruits in those localities where irrigation is required; and it has for its object, mainly, the production of an implement for cutting ditches and preparing the ground between lines of ditches for growing strawberries and other small fruit.

As a compound implement the invention will be found useful for cultivating the land between lines of irrigating-ditches, also for keeping down the growth of weeds and grass in such ditches.

To such ends and purpose my invention consists, mainly, in the construction and combination of a ditch-cutter and a spacing-runner in a draft-frame so set and arranged that the runner travels in the previously-cut ditch and keeps the cutter in line while cutting the next ditch, whereby the implement is self-guiding and will lay off ditches at uniform distances and in true lines.

It consists, also, in a certain novel construction and combination of a scraper attachment or implement for leveling and dressing the ground between the lines of ditches.

In connection with this implement is provided a cultivator attachment specially designed for use in the frame.

The following description explains the nature of the said improvements and the manner in which I proceed to construct and produce my said implement.

In the accompanying drawings, Figure 1 is a front view of the implement arranged for ditching, and Fig. 2 is a top view of the same. Fig. 3 is a side elevation taken from the left-hand side of Fig. 2. Fig. 4 is a side view of the implement with the ditch-cutter thrown out of action and the scraper or leveling attachment in position. Fig. 5 is a side view of the implement with the cultivator attachment in position. Fig. 6 is a top view, and Fig. $6^a$ is a bottom view, of the cultivator attachment. Fig. 7 is a perspective view of the scraper or leveling attachment.

The frame of the implement is formed of the longitudinal bars $A\ A^x$, the transverse bars $A^2\ A^3$, and the standards $B\ B^x$, all bolted together to form a light but strong rectangular draft-frame. The space between the bars $A\ A^x$ corresponds to the distance between one line of ditch and the next. Draft-hooks $d\ d$ are attached to the front cross-bar $A^2$ at a suitable distance apart to bring each animal of the team into the ditch or directly ahead of the runners $A\ A^x$.

The cutting and excavating parts of the implement formed of the plow E and the cutter F are fixed to two beams G G, which at the front end are attached to the draft-frame by a long bolt or rod H, passing through the rear standards $B^x$ and through eyes in the beams at the front end, and are capable of being raised or lowered at the rear end on this point, as shown by the dotted lines in Fig. 3.

The plow E is formed of a block of wood with its bottom rounded and covered with sheet metal to prevent wear and its front or leading end pointed and beveled to produce a backwardly-inclined cutting-edge $e$, with angular faces extending from the cutting-edge backward and outward to the full width of the block, as seen in Figs. 1 and 3. The bottom of the plow is half-round in cross-section at any point back of the cutting-edge, and in thickness it is equal to the width of the ditch to be made.

The cutter F is formed of a bow-shaped strip of iron, attached to the beams G G by clips or strap-washers I I in front of the plow, and having the bow portion $f$ of the same curve as the rounded bottom of the plow, and both that part and its straight members $f^x\ f^x$ setting in line with the bottom and sides of the plow, the front edges of the bow and the upright members being beveled to a sharp cutting-edge, if necessary.

The cross-beam K sets across the plow-beams behind their point of attachment to the frame, and is held down by loops L L, placed over the ends and under the cross-bar of the frame, as seen in Figs. 1 and 2, the placing-blocks *m m* being interposed between the plow-beams and the cross-beam.

The depth of the cut is altered by shifting the rod H to a higher or lower hole in the standard and by placing blocks *m* of different thickness between the beams G and the holding-down beam. The plow is also thrown out of action and held above the surface by removing the holding-down beam from its position and setting one end under the front rod H$^\times$ of the front standards of the frame, with the other end inserted under the cross-bar *g* of the plow-beam, the latter being lifted at the rear end for that purpose, and by this means the rounded body of the plow and the cutter at the front are raised and supported clear of the ground. This position is represented by the dotted lines in Fig. 4.

The runner C, fixed underneath the side bar A$^\times$ of the frame, is rounded at the bottom and protected by a metal sole in similar manner to the plow-body, and the distance between these two parts of the implement corresponds to the space to be left between the ditches. The runner C therefore travels in the previously-cut ditch and serves to properly space and control the cutter on the opposite side of the frame while forming the next ditch.

In preparing beds for the cultivation of strawberries the ditches should be about five feet apart between center lines, leaving the bed of sufficient width to accommodate two rows of plants with a path between, and forming ditches of about twenty-one inches in width. That part of the ground between the ditches is leveled and dressed away from the ditch along both edges by means of the scraper attachment P P', which is set into the frame between the side bars, and is held by cross slat or bar A$^4$ at the front end. A driver's seat may be placed on the rear cross-bar of this scraper, if desired. The form of this part of the implement is represented in Figs. 4 and 7. To the side bars $p^\times p^\times$ of the triangular frame are secured two scraping-plates P' in divergent position, with the leading ends set to run quite close to the inner line of the ditches along both sides of the bed, and the rear ends meeting, if prolonged, on a center line drawn through the bed parallel with the ditches. These ends of the scrapers are not brought together, however, but an opening is left between them to discharge the soil from between the scrapers in a line along the center of the bed. The office of this attachment therefore is to bring the soil from the outer edges of the bed toward the center and to properly level it to receive the plants. The top edges of the ditch are rounded off by the curved scrapers R R, secured to the heel of the plow-body at the top and bent to stand out from the sides of the block in such manner that they will bevel or take off the top edge of the ditch along both sides, thus throwing the earth upon the bed and preventing it from falling back into the ditch. When the scraper is in position, the front or wide end of the frame sets against the draft-beam, as indicated by the dotted lines in Fig. 2, and under the cross-piece A$^4$; but in adjusting the implement for cultivating between the rows of plants this scraper is removed and the cultivator attachment S T (illustrated in Figs. 5, 6, and 6$^a$) is fixed in the draft-frame. Cultivator-teeth S S$^\times$ on the lower ends of standards S' are fixed in slots S$^2$ in the bars T T$^\times$ of the frame, and the front ends of the bars are slotted to take the rod H$^\times$, which is removed from the rear standards and inserted through the holes *b* in the front standards. The standards S' are held by keys $t^2$, driven into the slots in the bars.

The form and position of the blades S S$^\times$ will be understood from the bottom view, Fig. 6$^a$. The middle blade S$^\times$ is of triangular shape and sets across the space between the rear ends of the two side blades, with the pointed end to the front. The last-named blades are of ordinary shape, and are set to throw the soil from the plants toward the center. Loosely attached to the standards S' of these blades by straps V are trail-boards W, that extend rearwardly beyond the cultivator-blades and between the plants and the outer edges of the blades, as seen in Figs. 6 and 6$^a$. These boards keep the earth from being thrown upon the plants as the cultivator is drawn along between the rows, and are found to be a useful appendage to the cultivator attachment in running between rows of young plants.

The bars T T$^\times$ are united in a stiff frame by the cross-pieces $t^2 t^2$, the outer bars being set slightly divergent at the rear end at equal angles with the center bar, which is set straight or on the center line. A weight X is placed on the rear end of the center bar to hold down the attachment to its work; or the weight of the driver may be made to serve that purpose, a seat being fixed on the end of the bar in place of the weight. The front end of the center bar is pierced with a hole S$^3$ for the rod H$^\times$; but the ends of the side bars have open slots S$^4$ S$^4$ for the rod, so that the frame can be shifted laterally or moved toward one side or the other to bring the cultivator-blades closer to or farther from the plants by simply throwing the rear end of the frame toward one side or the other from the center.

In using the implement the plow is set to cut the desired depth, and a guide-trench having been previously run along the field by turning a furrow with an ordinary plow the runner C is set into that trench. The implement is run back and forth over the field until the required number of ditches is made, the runner being set after the first ditch is cut to travel back in the previously-formed ditch. In this operation the leveling attachment or scraper P P' is placed in the frame.

To keep down weeds and clear the ditches of grass, the implement is run through them from time to time, as necessary, during the season; but the scrapers are detached, of course, and taken out of the frame.

The implement, with the cultivator-attachment, is useful in subsequent operations between the rows while the plants are growing, as the frame and its runners serve to guide the cultivator between the rows and prevent injury to the young plants.

The detachable parts of the implement are readily removed, and one is substituted for the other without difficulty, thereby making the implement convertible into a ditcher or a cultivator at will and furnishing two useful implements with a single draft-frame.

As the implement is capable of being used for laying off and running lines of irrigating-ditches where the land between does not require to be leveled or cultivated, I desire to claim it separate from the leveling and cultivating attachments.

Having thus fully described my invention, what I claim, and desire to secure by Letters Patent, is—

1. In a ditching-machine, the combination of a draft-frame, the runners A C, and the cutter consisting of the round-bottom plow E, having the inclined cutting-edge $e$, and the bow-shaped cutter F, fixed to the beams or bars G G, as described, which are attached to the draft-frame by a hinge or pivot joint.

2. In combination with the plow having a round-bottom body and inclined and bevel cutting-edge and mounted on the plow-beams G G, the bow-shaped cutter secured to the beams in front of the plow-body, the draft-frame having guide-runners A C, standards B $B^x$ $B^x$, and the rod H, adapted to take through the plow-beams and the standards, substantially as described.

3. In combination with the plow E, having a round-bottom body and an inclined and bevel cutting-edge $e$, fixed to the beams G G, the curved scrapers R R, attached to the rear end of the body at the upper part, substantially as described.

4. The combination of the draft-frame having guide-runners A C, the pivoted plow-frame having a plow-body E with rounded bottom and inclined beveled cutting-edge arranged for operation at one side of the draft-frame parallel with the opposite guide-runner C and adapted to receive the triangular scraper-frame P $P^x$ for operation between said plow and the opposite guide-runner, said scraper-frame having divergent scrapers P' P', fixed in their said frame in position as specified, for operation as set forth.

5. In a compound implement, the cultivator attachment adapted for insertion in the draft-frame in place of the scraper attachment, as described, and consisting of the bars T $T^x$ and cross-bars $t^2$, the middle bar having an eye $S^3$ and the side bars having open slots $S^4$ for the coupling-rod H, wherewith to attach said frame to the draft-frame, the cultivator teeth or blades $S^x$S on the standards, and the trail-boards W, applied for operation as set forth.

In testimony that I claim the foregoing I have hereunto set my hand and seal.

OWEN THOMAS DAVIES. [L. S.]

Witnesses:
JOHN M. DAVIES,
A. B. BURN.